Figure 1:
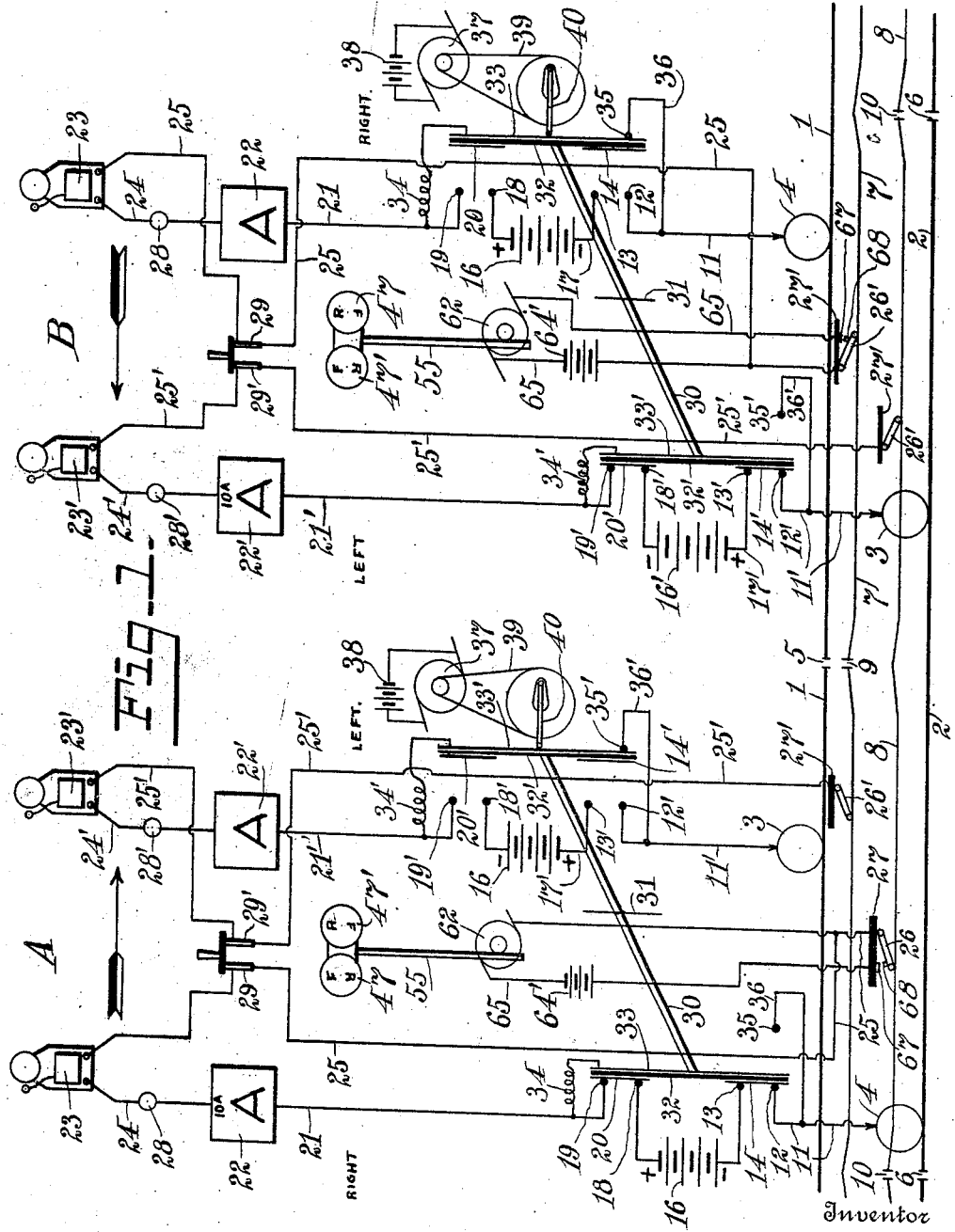

G. H. SMITH.
BLOCK SIGNAL SYSTEM.
APPLICATION FILED DEC. 7, 1910.

1,041,686.

Patented Oct. 15, 1912.

5 SHEETS—SHEET 1.

Witnesses
Inventor
Geo. H. Smith
By R. J. McCarty
his Attorney

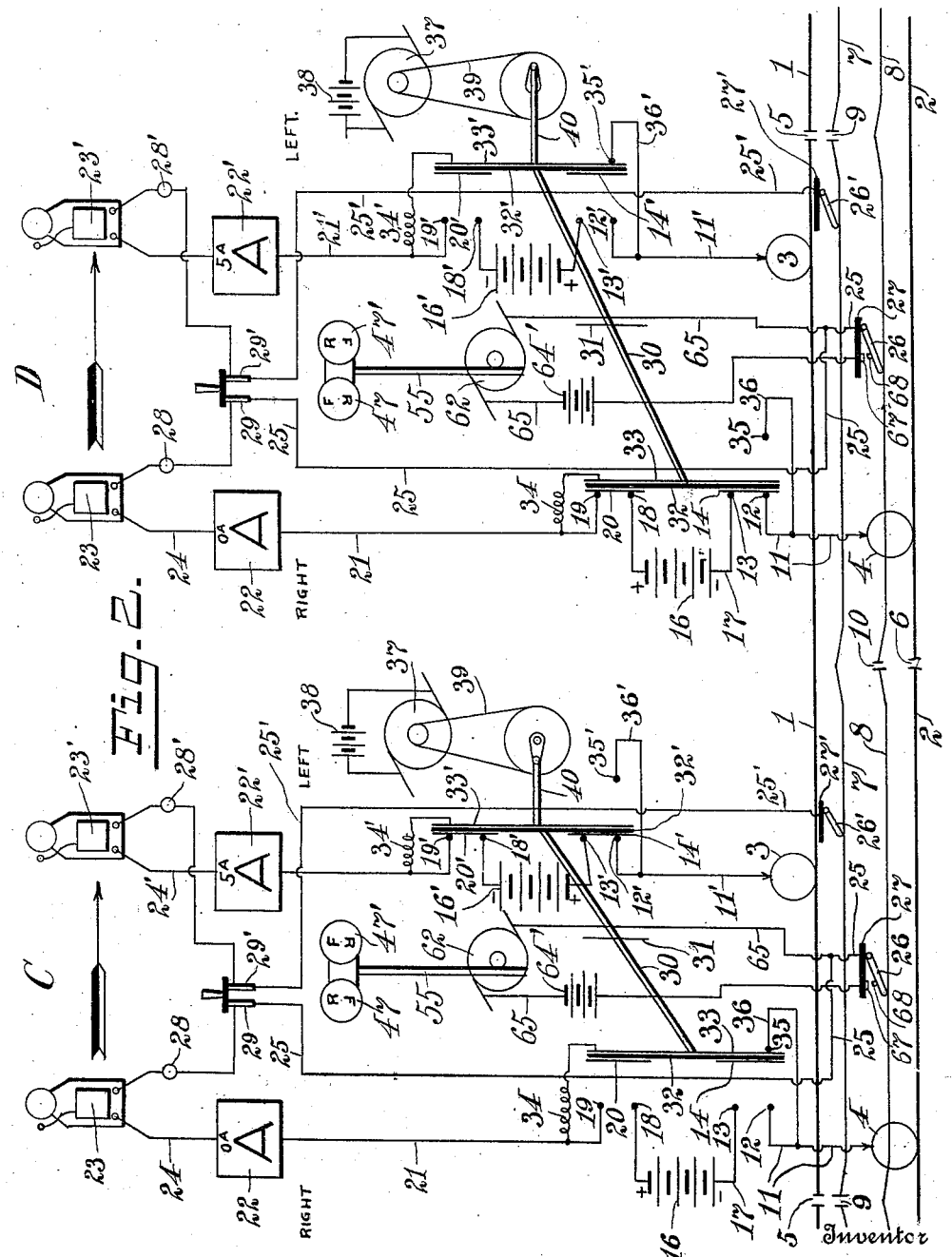

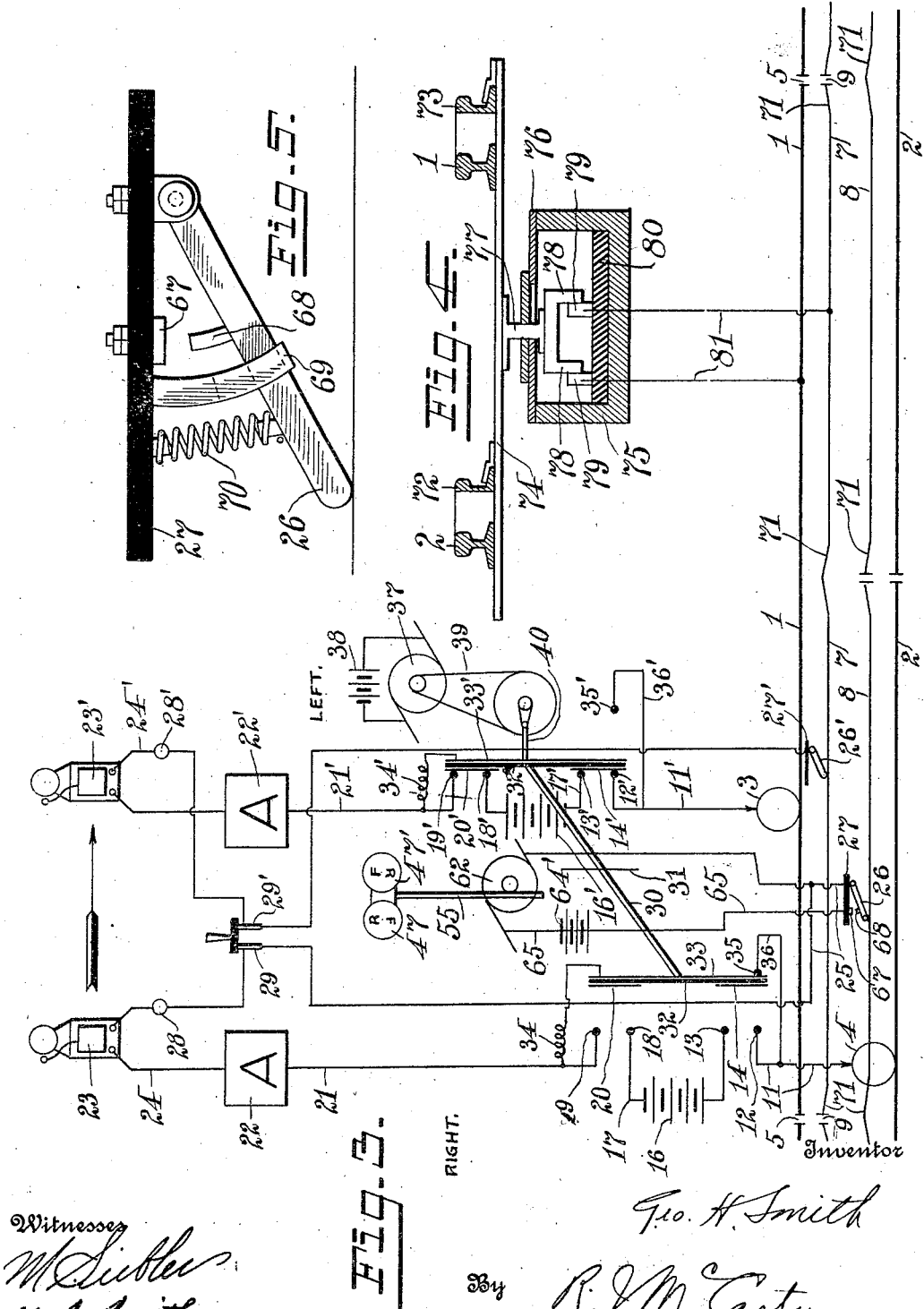

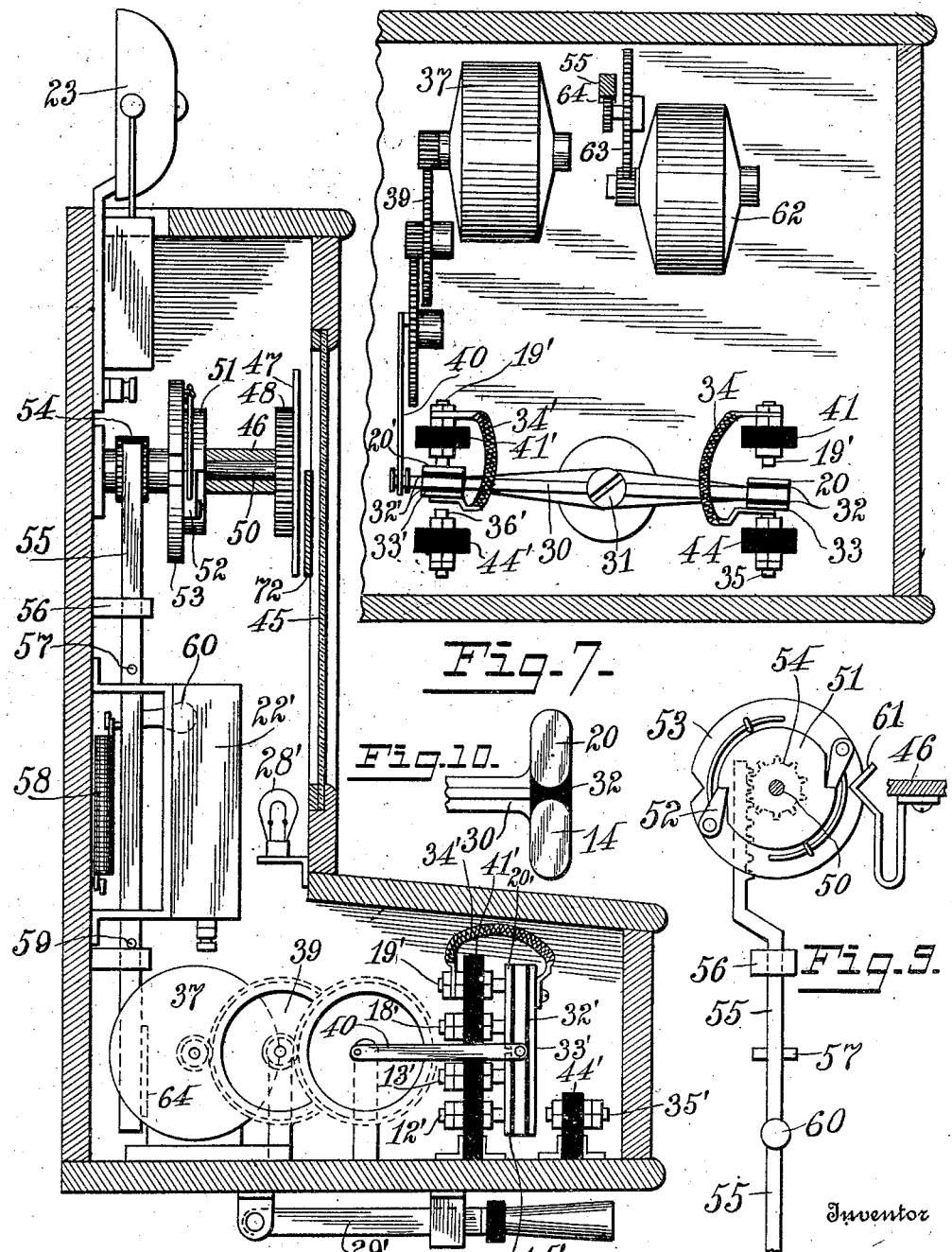

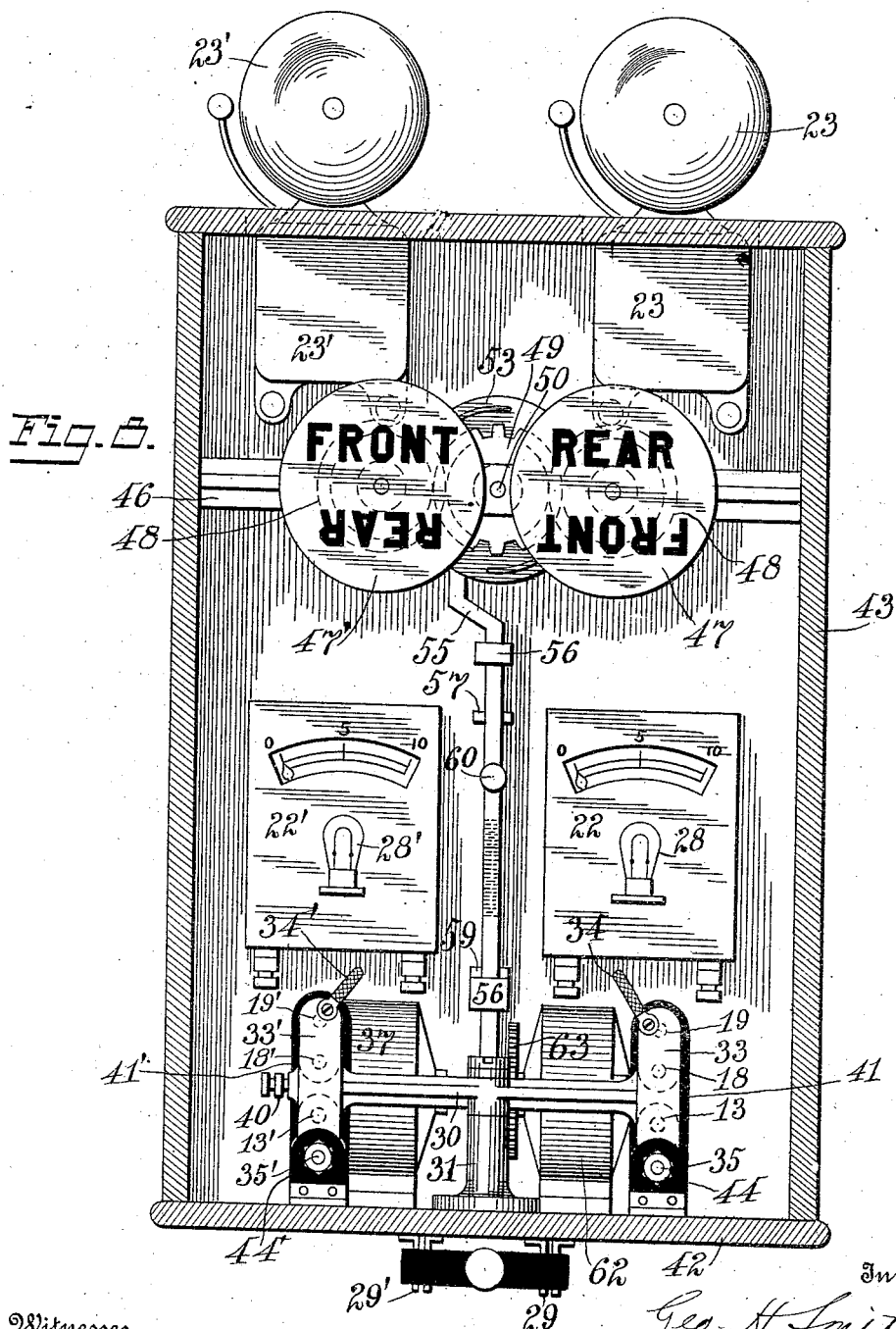

UNITED STATES PATENT OFFICE.

GEORGE H. SMITH, OF DAYTON, OHIO, ASSIGNOR OF ONE-THIRD TO CHESTER L. SMITH AND ONE-THIRD TO ROBERT C. SMITH, BOTH OF DAYTON, OHIO.

BLOCK-SIGNAL SYSTEM.

1,041,686.  Specification of Letters Patent.  Patented Oct. 15, 1912.

Application filed December 7, 1910. Serial No. 596,103.

*To all whom it may concern:*

Be it known that I, GEORGE H. SMITH, a citizen of the United States, residing at Dayton, in the county of Montgomery and State of Ohio, have invented certain new and useful Improvements in Block-Signal Systems; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in electric block signals for railroads.

The object of the invention is to provide a block signal system by means of which the engineer may be informed of the proximity of open switches and the proximity of other trains either in the front or the rear of his train.

Other objects of the invention will appear in the specification, and will be particularly pointed out in the claims.

In carrying out the invention, various electrical instrumentalities are carried in duplicate within a casing upon each locomotive, and consist of visible and audible signals. These instrumentalities are connected with tracks and trolleys which are divided into blocks of any convenient length. There are provided two sets of blocks, right and left, both being of the same length, but the end of one block being placed opposite the center of the opposite block.

While I have described the device as applied to locomotives, it will be understood that it is equally adapted for electric cars on interurban roads.

Referring to the annexed drawings, Figure 1 is a diagrammatic view of the instrumentalities as carried upon two different locomotives, said locomotives traveling in opposite directions or toward each other; Fig. 2 is a similar view showing one locomotive approaching another from the rear; Fig. 3 is a similar view showing a locomotive approaching a switch; Fig. 4 is a section through a switch near the points showing the electrical switch operated thereby; Fig. 5 is a detail view of one of the trolley collectors; Fig. 6 is a side elevation, partially in section, of the casing placed within the locomotive and which contains the various instrumentalities; Fig. 7 is a top plan view of the oscillating switch and its actuating mechanism; Fig. 8 is a front elevation of the casing partially in section; Fig. 9 is a detail view of the direction indicator; Fig. 10 is a detail view of terminal members of a multiple switch which cuts out certain batteries to vary the voltage.

Throughout the specification and drawings, similar reference characters indicate corresponding parts.

Referring more particularly to the drawings, 1 and 2 are the main tracks of a railroad, over which the wheels 3 and 4 of the locomotive or train pass. The rails 1 and 2 are provided with broken or insulated joints 5 and 6 which form the blocks and which may be, for example, four miles apart on each rail. The joints 6 of the rail 2 lie opposite a point intermediate the joints 5 of the rail 1. The joints 5 and 6 are therefore in staggered positions, and lie, in the present case, two miles apart. Lying parallel with each of the rails 1 and 2 are trolley wires 7 and 8 provided with broken joints 9 and 10 which lie opposite the respective joints 5 and 6 of the rails 1 and 2. The joints 9 and 10 of the wires 7 and 8 are staggered in position, as are the joints 5 and 6 of the rails 1 and 2. Each rail 1 and 2, and their respective trolley wires 7 and 8, form portions of separate electrical circuits. It will therefore be seen that the blocks are provided in duplicate and are placed alternately. The circuits partially formed by the rails 1 and 2, and the trolleys 7 and 8, are, at certain times, completed by the instrumentalities carried on the locomotives. These instrumentalities are provided in duplicate, corresponding to the duplicate blocks as follows:

On the right of each locomotive is the wheel 4 which is in electrical contact, by means of a brush or otherwise, with one end of an electrical conductor 11. The other end of this electrical conductor 11 is attached to a switch point 12 which is, at certain times, connected to a similar switch point 13 by means of a switch member 14. The switch point 13 is in electrical connection with a battery 16 or other source of electric energy, through connections 17. The other terminal of the battery 16 is electrically connected to a switch point 18 adapted to be connected with a similar point 19 through a switch member 20 similar to the switch member 14. The switch point 19 is electrically attached to a conductor 21 leading to one terminal of an ammeter 22, the other terminal of which is connected to a bell 23 or other indicator, through a connector 24. The bell 23 is in electrical connection with the trolley wire 8 through a connector 25 and a trolley brush 26 mounted on an insulated member 27 (as shown in detail in Fig. 5) and which may be attached to a convenient portion of the locomotive. The portion of the electric circuit as above described, may be provided with a lamp 28 placed in close proximity to the ammeter 22, and a switch 29, the purpose of which will be hereinafter explained.

The switch members 14 and 20 are mounted upon one end of a swinging arm 30 pivoted at 31, and insulated therefrom and from each other by insulation 32. There is also mounted on this end of the arm 30 a switch member 33, which is at all times in electrical connection with the conductor 21 by means of a flexible connection 34. The switch member 33 is adapted at certain times to engage a switch point 35 in electrical connection with the conductor 11 through a conductor 36. The switch point 35 is separated from the terminal members 12, 13, 18 and 19, which allows the switch members 14, 20 and 33 on one end of the arm 30 to oscillate between them. It will be seen from the above description, that, when the switch members 14 and 20 are in contact with the switch points 12, 13, 18 and 19, the battery 16 will energize the entire circuit; and when the switch member 33 is in electrical connection with the switch point 35, the battery 16 will be eliminated.

Similarly on the opposite side of the locomotive, which may be considered the left side, the wheel 3 is within a duplicate circuit which consists of the conductor 11', switch points 12', switch member 14', switch point 13', battery 16', switch point 18', switch member 20', switch point 19', ammeter 22', conductor 24', bell 23', and conductor 25'. This circuit is also provided with a switch point 35' adapted to be engaged by a switch member 33' connected to the conductor 21' through the flexible connection 34'. The switch members 14', 20' and 33' are mounted on the opposite end of the arm or lever 30 and insulated therefrom by means of insulation 32'. The lever 30 may be adapted to be oscillated by means of a motor 37, energized by a battery 38, through suitable reduction gearing 39 and a connecting rod 40. The arrangement is such that when the switch members 14 and 20 are in contact with the switch points 12, 13, 18 and 19, the switch member 33' will be in contact with the switch point 35, and vice versa.

The motor 37 continually oscillates the lever 30 and the switch members carried thereby, but each motor on the various locomotives oscillates its respective lever 30 at different periods. The object of this mechanism is to prevent the batteries being placed or connected in opposition when two locomotives are on the same block and running in the same direction.

The right and left circuits as above described, are identical with the exception of the batteries 16 and 16', which are connected into their respective circuits in opposite polarity. As shown in the drawings, the wheel 4 of the right circuit is electrically connected to the negative pole of the battery 16, while the left wheel 3 is connected to the positive pole of the battery 16'.

In the actual construction of the above devices, the switch points 12, 13, 18 and 19 and the similar switch points in the opposite circuits, may be mounted on insulated standards 41 on the base 42 of a casing 43. The switch points 35 and 35' may also be mounted in insulated standards 44 on said base 42. The base 42 may also act as a support for the motor 37 and the reduction gearing 39. The ammeters 22 and 22' may be suitably mounted on the back of the casing 43, while the bells 23 and 23' may be mounted at the top of the casing with the bell proper on the outside, as is shown in the drawings. The ammeters may be viewed through a glass door 45, which also allows access to the interior of the casing. The switches 29 and 29' may be located at suitable points within or without the casing, such as the under side of the base 42 where it is easily accessible. I have not shown the electrical connections between the various instrumentalities within the casing 43 in Figs. 6, 7 and 8, as they are clearly shown in the diagrammatic views. The batteries 16, 16' and 38 may be suitably located in the cab of the locomotive, for example, under the seat of the engineer. It will be understood that the right and left circuits as above described, are placed on each locomotive, and when two locomotives are approaching each other and enter the same block, as is shown in Fig. 1, the battery 16 of the locomotive A will be in series with the battery 16' of the locomotive B. If each battery 16 or 16' has a capacity of five volts, then ten volts will be indicated on the ammeters 22 and 22' when the switches on the lever 30 are both closed.

Whenever a locomotive C approaches a locomotive D from the rear on the same block, as is shown in Fig. 2, the battery 16' of the locomotive C will be in opposition with the battery 16' of the locomotive D, and normally the ammeters will not indicate. But as the levers 30 are continually rocking at periods of unequal time, there will be points when one of the batteries 16' will be connected into the circuits and the ammeter will indicate five amperes.

When the current passes through the ammeters 22 and 22', it also passes through the bells 23 and 23', which will give an audible signal, and through the lamps 28 and 28' thereby giving an illuminous signal and by means of which the ammeter may be read. It will be seen from the above description that if the ammeters fluctuate from zero to five to ten, the engineer will be informed of the approach of another locomotive in front, but, if the ammeters fluctuate from zero to five, he will be informed that another locomotive is approaching in the rear, or that he is approaching another locomotive running in the same direction.

In addition to the above, there is also provided an indicator which informs the engineer of the direction of approach of another locomotive by the bells alone. It will be noted in connection with the fact that the right and left blocks are staggered, that, if the circuit for the right bell 23 has just entered a block, said circuit can only be completed by a locomotive approaching from the front, consequently if the right bell 23 would then be rung, it would indicate that a locomotive was on the same block in front. After the same circuit has entered the last half of the same block, the opposite circuit has just entered its respective block and would be in a position to indicate when another locomotive is in front; while the circuit for the bell 23, or right circuit, would be in a position on the latter half of its respective block, and would therefore be in a position to indicate when a locomotive is on the same block in the rear. It will therefore be seen, that, if a "front" and "rear" indicator be provided for each bell, which would change at the beginning of each alternate block, or twice for each block, said bells can independently indicate the position of another locomotive. These indicators and their actuating means are constructed as follows: Mounted within the casing 43 and journaled in a cross-arm 46, is a right hand dial 47 for the bell 23, and a left hand dial 47' for the bell 23'. Each of the dials 47 and 47' is provided with the words "Front" and "Rear", and said dials are so situated, that, when "Front" is indicated on one dial, "Rear" will be indicated on the other dial. To enable the indications on the dials 47 and 47' to be read without confusion, the words on the lower half of the dials may be obscured by a plate 72. To change the indications on the dials, which occurs at the beginning of each alternate block, said dials are given a half revolution simultaneously as follows. Each dial 47 and 47' is provided with a gear 48 which meshes with a gear 49, of the same size, on a shaft 50 journaled in the cross-arm 46 and the rear of the casing. Mounted on the shaft 50 is a ratchet 51 adapted to be engaged by spring-controlled pawls 52 on a dial 53 journaled on the shaft 50. The dial 53 is provided with a pinion 54 engaged by a vertically reciprocating rack 55 mounted in bearings 56. The upward movement of this rack 55 is limited by a pin 57, and its downward movement is controlled by a spring 58 and limited by a pin 59. The pinion 54 is of such a size that each upward movement of the rack 55 rotates the dials 47 and 47' one half of a revolution. The rack 55 may be provided with a finger knob 60, by means of which the dials 47 and 47' may be initially set, and the various members mounted on the shaft 50 are held against jar by a spring pawl 61 mounted on the cross-arm 46. The rack 55 is moved upwardly to give the dials 47 and 47' a half revolution, by means of a motor 62 and a suitable reduction gearing 63 which meshes with teeth 64 on the lower end of the rack. The motor 62 is energized by a battery 64' through a circuit 65 shown in the diagrammatic views. One terminal of this circuit is connected, as shown in the drawings, to the trolley 26, while the other terminal is connected to a contact point 67 on the insulated member 27. Adapted to contact with the point 67 (see Fig. 5) is a point 68 on the trolley 27. The trolley 27 moves in a guide 69 and is pressed downward against the trolley wires 7 and 8 by a spring 70. The trolleys are moved upward to complete the circuit 65, through the points 67 and 68, by cams 71 on the trolley wires 7 and 8', and which are placed at the beginning and the intermediate point of each block. It will therefore be seen, that, when the locomotive enters either one of the right or left blocks, the indications on the dials 47 and 47' will be reversed. It will be noted, that, as shown in the drawings, the right hand trolleys 26 act as collectors for the bell circuits and circuit closers for the motor 62; but it will be understood that separate devices may be provided to perform these separate functions.

The arrangement of the mechanism for indicating when an open switch is being approached is as follows: In Fig. 4, 72 and 73 represent switch tongues which coöperate with the main rails 1 and 2 to form a railway switch. The tongues 72 and 73 are connected by means of the usual tie bar 74 by means of which the switch may be thrown. Mounted below the tie bar 74 is a box 75 provided with a slotted cover 76 in which an arm 77, attached to the tie bar 74, is adapted to reciprocate. Mounted on the arm 77, and within the box 75, are contact points 78 adapted to engage contact points 79 mounted on suitable insulation 80 within the box 75. The contact points 79 are connected with either of the circuits formed by the rail 1 and trolley 7, or the rail 2 and the trolley 8, by a circuit 81. It is preferable to have this circuit 81 connected into the block near its far end, which will give the engineer sufficient time or notice when he is approaching an open switch. It will be noted from Fig. 3, which shows a locomotive approaching a switch, that, when the wheel 3 and the trolley 26' reaches the same block in which the circuit 81 is connected, an entire circuit will be completed when the switch points 12' and 13', 18' and 19' contact with the switch members 14' and 20'. The battery 16' will therefore energize the bell 23' and the ammeter 22' will periodically indicate five amperes. The oscillations of the pointer of the ammeter will be regular, as the circuit is controlled by only one motor 37, which will be a distinctive feature of the signal given when a locomotive is approaching an open switch. When the locomotive goes into service, the engineer sets the dials 47 and 47' by means of the knob 60 according to the position of the locomotives in reference to the blocks. If the locomotive is on the forward end of the right block, the dial 47 is set to read "Rear", but if the locomotive is on the rear end of the right block the dial 47 is set to read "Front". When the dial 47 is set, the dial 47' will also be set as the two dials are connected as described. When the locomotive is running, the dials will be automatically shifted by the cams 71. When two locomotives are attached to a single train, only the first locomotive will receive the signals, as the circuits on the second locomotive will be broken at the switches 29 and 29' by the engineer.

Having described my invention, I claim:

1. In a railway signaling device, two pairs of parallel electrical conductors extending along the track and divided into insulated block sections, the block sections of one pair being staggered with relation to those of the other pair, two partial traveling circuits carried by the cab, each including a source of energy and an indicator, and coöperating respectively with the two pairs of conductors along the track, a two position indicator mechanism carried by the cab, means located along the track at the beginning and at the middle of each block section for operating said two position indicator mechanism to cause the same to assume alternative position and thereby indicate the relative position of the partial traveling circuits with respect to the block sections, whereby when two cabs similarly equipped occupy the same block, the several indicators in each cab will jointly indicate the positions of the one cab with respect to the other.

2. In a device of the type specified, right and left parallel stationary conductors, first partial traveling circuits adapted to be connected respectively with said right and left stationary conductors, said partial circuits being right and left relative to the direction of travel, second partial traveling circuits adapted to be connected with the said stationary conductors and also right and left relative to the direction of travel, an ammeter in each partial traveling circuit, an electrical energizer and a shunt circuit around said energizer in connection with each partial traveling circuit, the energizers for the right partial traveling circuits being arranged for connection with their respective circuits in opposite polarity to those of the left whereby the current flows in relatively opposite directions in said right and left partial traveling circuits, an oscillating switch associated with each of said partial traveling circuits adapted in one position to connect the energizers with their respective partial circuits and in another position to eliminate the energizers from their respective partial circuits and to connect the shunt circuit around said energizers to said respective partial circuits, the period of oscillation of the switches for the first partial traveling circuits being different from those of the second partial traveling circuits, whereby when the first and second partial traveling circuits are traveling in the same direction and are connected with the same stationary conductors, said ammeters will indicate zero or the capacity of one of the energizers; and when said partial traveling circuits are traveling toward each other and are connected with the same stationary conductors, said ammeters will indicate zero or double the capacity of one of the energizers.

3. In a device of the type specified, right and left parallel stationary conductors, the ends of the right conductors being placed at an intermediate point of the left conductors, first partial traveling circuits adapted to be connected respectively with said conductors, said partial circuits being right and left relative to the direction of travel, second partial traveling circuits adapted to be connected with said stationary conductors and also right and left relative to the direction of travel, an ammeter in each partial traveling circuit, an electrical energizer and a shunt circuit around said energizer in connection with each partial traveling circuit, the energizers for the right partial traveling circuits being arranged for connection with their respective circuits in opposite polarity to those of the left whereby the current flows in relatively opposite directions in said right and left partial traveling circuits, an oscillating switch associated with each of said partial traveling circuits adapted in one position to connect the energizers with their respective partial traveling circuits, and in another position to eliminate the energizers from their respective partial traveling circuits and to connect the shunt circuit around said energizers to said respective partial circuits, the period of oscillation of the switches for the first partial traveling circuits being different from those of the second partial traveling circuits, whereby, when the first and second partial traveling circuits are traveling in the same direction and are connected with the same stationary conductors, said ammeters will indicate zero or the capacity of one of the energizers; and when said partial traveling circuits are traveling toward each other and are connected with the same stationary conductors, said ammeters will indicate zero or double the capacity of one of the energizers.

4. In a device of the type specified, right and left parallel stationary conductors, said right stationary conductors being arranged in staggered positions relative to the left stationary conductors, a first set of right and left partial traveling circuits adapted to be connected with said stationary conductors, a second set of right and left partial traveling circuits adapted to be connected with said stationary conductors, an indicator in each of said partial traveling circuits, an energizer in each of said partial traveling circuits, the energizers for the left circuits being connected with their respective circuits by opposite polarity from that of the right circuits, whereby the current flows in relatively opposite directions in the right and left circuits, an oscillating switch in each partial traveling circuit adapted to eliminate each energizer from its respective circuit, the switches of the first set of partial traveling circuits having different periods of oscillation from those of the second set, a second or direction indicator for the first set of circuits, a similar second indicator for the second set of circuits, means located at the beginning of the right stationary conductors, and means located at the beginning of the left stationary conductors for actuating said second indicators, whereby said first and second indicators of one set of partial traveling circuits are adapted to indicate the position of the other set of partial traveling circuits relative to the stationary conductors, when a partial traveling circuit of each set is connected with the same stationary conductors.

In testimony whereof I affix my signature, in presence of two witnesses.

GEORGE H. SMITH.

Witnesses:
R. J. McCarty,
Matthew Siebler.

---

Copies of this patent may be obtained for five cents each, by addressing the "Commissioner of Patents, Washington, D. C."